`US007742882B2`

United States Patent
Fredriksson et al.

(10) Patent No.: US 7,742,882 B2
(45) Date of Patent: Jun. 22, 2010

(54) METHOD FOR DETERMINATION OF MEAN ENGINE TORQUE

(75) Inventors: Krister Fredriksson, Kyrkesund (SE); Fredrik Wattwil, Landvetter (SE); Sven-Ake Hurtig Ahlinder, Sävedalen (SE)

(73) Assignee: Volvo Lastvagnar AB, Göteborg (SE)

( * ) Notice: Subject to any disclaimer, the term of this patent is extended or adjusted under 35 U.S.C. 154(b) by 468 days.

(21) Appl. No.: 11/577,890

(22) PCT Filed: Nov. 17, 2004

(86) PCT No.: PCT/SE2004/001679

§ 371 (c)(1), (2), (4) Date: Apr. 25, 2007

(87) PCT Pub. No.: WO2006/054928

PCT Pub. Date: May 26, 2006

(65) Prior Publication Data

US 2009/0132182 A1    May 21, 2009

(51) Int. Cl.
*G01L 1/00* (2006.01)
(52) U.S. Cl. .................. 702/41; 702/33; 73/1.09; 701/84; 701/90; 123/406.23
(58) Field of Classification Search .................. 702/33, 702/41; 73/1.09; 701/84, 90; 123/406.23
See application file for complete search history.

(56) References Cited

U.S. PATENT DOCUMENTS

| 4,843,870 | A | * | 7/1989 | Citron et al. ............. 73/114.15 |
|---|---|---|---|---|
| 5,200,899 | A | | 4/1993 | Ribbens et al. |
| 5,239,473 | A | | 8/1993 | Ribbens et al. |
| 5,753,804 | A | * | 5/1998 | La Palm et al. .......... 73/114.04 |
| 5,771,482 | A | * | 6/1998 | Rizzoni ...................... 701/101 |
| 5,856,922 | A | | 1/1999 | Jehanno |
| 6,725,709 | B2 | | 4/2004 | Takaku et al. |
| 2003/0167118 | A1 | * | 9/2003 | Rizzoni et al. .............. 701/101 |
| 2008/0294326 | A1 | * | 11/2008 | Andren ....................... 701/103 |

OTHER PUBLICATIONS

Rizzoni, "Estimate of Indicated Torque from Crankshaft Speed Fluctuations: A Model for the Dynamics of the IC Engine," IEEE Transaction on Vehicular Technology, vol. 38, No. 3 (1989).*
International Search Report for corresponding International Application No. PCT/SE2004/001679.

* cited by examiner

*Primary Examiner*—Sujoy K Kundu
*Assistant Examiner*—Hyun Park
(74) *Attorney, Agent, or Firm*—WRB-IP LLP

(57) ABSTRACT

A method for producing a value T being representative of the mean engine torque generated on a crankshaft of an internal combustion engine includes the steps of producing a speed vector including values being representative of instantaneous speeds of the engine during a sampling period, determining a mean engine speed n during said sampling period from the speed vector, determining a value Px, being representative of the frequency contribution of the speed vector at the frequency x*n, where x is a pre-selected order, and producing a value T being representative of the mean engine torque on the crankshaft during said sampling period, wherein T is derived from a mathematical expression including a polynomial having at least a term k*n*Px, where k is a polynomial constant. A device for producing a value T is also disclosed.

26 Claims, 2 Drawing Sheets

METHOD FOR DETERMINATION OF MEAN ENGINE TORQUE

BACKGROUND AND SUMMARY

The present invention relates to a method for producing a value T being representative of the mean engine torque generated on a crankshaft of an internal combustion engine. It also relates to a device for producing such a value.

For engine diagnostic purposes, a useful parameter is the engine torque generated on the crankshaft of an engine. Faults or irregularities in the function of the engine will result in diminished or irregular engine torque. In a more detailed diagnosis, once a faulty engine torque value has been detected, it could be further analysed so as to provide information regarding the likely source of error, such as an injector fault or other error source. Thus, it is desirable to provide a measure of the engine torque generated on a crankshaft of an engine in a vehicle. Previously, a number of methods have been proposed for determining the engine torque from selected measurements performed on the engine and using different mathematical methods.

U.S. Pat. No. 5,771,483, Moine et al. describes one such prior art method for calculating the torque of an engine, including the detection of the passage before a sensor of each of the teeth of the inertial flywheel of an engine, and using the time of passage of each of these teeth in the calculation of a torque of an engine. Another method of this type is described in EP 1 052 488, Abida et al.

It is desirable to provide a measure of the mean engine torque generated on a crankshaft of an engine in a vehicle that is useful for engine diagnostic purposes. It is desirable to provide a measure of the mean engine torque that may be used for diagnostics of an engine during normal operating conditions. It is desirable to provide a measure of the mean engine torque that may give a sufficiently accurate measure whilst being limited to reasonable requirements for processor capacity, storage space etc.

According to an aspect of the present invention, a method for producing a value T being representative of the mean engine torque generated on a crankshaft of an internal combustion engine is provided, the method comprising the steps of producing a speed vector including values being representative of instantaneous speeds of the engine during a sampling period, determining a mean engine speed n during said sampling period from the speed vector determining a value Px being representative of the frequency contribution of the speed vector at the frequency $x*n$, where x is a pre-selected order, and producing a value T being representative of the mean engine torque on the crankshaft during said sampling period wherein T is derived from a mathematical expression including a polynomial having at least a term $k*n*Px$, wherein k is a polynomial constant.

The method according to the invention provides a useful measure of the mean engine torque that has the advantage of being applicable to situations in which the vehicle is under load, i.e. during normal driving conditions. It has further the advantage that it is executable using a relatively low number of samples and using relatively few calculations, resulting in a fast calculation that may be made without need for additional processing power in the vehicle.

The mean engine torque obtained using the method may be calculated at regular intervals during use of the vehicle and logged to provide a stored log being a chart over the vehicle's behaviour over time. When the vehicle is serviced, the log may be studied and conclusions regarding the state of the engine and possible necessary repair or replacement work.

A further advantage is that the mean engine torque measure obtained may be used to objectively evaluate the function of the engine. An ideal engine torque measure may be set for certain engine conditions and comparing the calculated engine torque with the ideal torque give an indication whether the engine fulfils the desired requirements or not.

The internal combustion engine may be used in different applications, such as in vessels or vehicles. Vehicles include e.g. cars, heavy duty vehicles and tracked vehicles. Preferably, the expression includes the polynomial: $k0+k1*Px+k2*n+k3*n*Px$, wherein $k0$, $k1$, $k2$ and $k3$ are polynomial constants, and advantageously $T=k0+k1*Px+k2*n+k3*n*Px$.

Advantageously, the selected order x may be equal to the number of cylinders of the engine divided by two. This selection of the order has been found to reflect the effect of a four-stroke engine particularly well. For two-stroke engines, the selected order x may instead be equal to the number of cylinders.

Advantageously, the sampling period corresponds to at least 10 rotations of the engine. Such a sampling period is long enough to ensure that the mean engine torque value includes the effect of all of the cylinders of the engine.

Advantageously, the speed vector comprises values t being representative of instantaneous speeds of the engine being the passages of time between subsequent rotational indexing references arranged in connection with a flywheel or crankshaft of the engine. This embodiment provides an efficient and relatively reliable method for calculating values being representative of instantaneous engine speeds.

In particular when a flywheel is used, the arrangement of the rotational indexing references is irregular at some locations. In this case, the method may comprise a compensation step when generating the speed vector, wherein effects of any irregularities in the arrangement of the rotational indexing references are compensated for.

Preferably, the value Px representing the power contribution for the frequency $x*n$ is determined using a Fourier series analysis of the speed vector. In this case, the speed vector should preferably include at least 500 samples so as to give satisfactory resolution.

Alternatively, the value Px may be determined by using a Fast Fourier Transform for the phase-amplitude transformation of the speed vector.

In this case, the RMS value of the area under the peak at the frequency $n*x$ in the phase-amplitude transformation is used as Px.

If Fast Fourier Transform is used in combination with selecting the RMS value of the xth order peak as Px, it has been found that good results are obtained when the speed vector includes at least 1000 samples, preferably at least 2000 samples.

Regardless of the phase-amplitude transform method used, the values t may advantageously be sampled with a sample interval with a duration of less than or equal to 10 microseconds, preferably less than or equal to 1 microsecond.

The loading conditions during the sampling period may be selected so as to correspond to at least 50% load, preferably to at least 60% load. This is advantageous since the conditions correspond to normal conditions when a vehicle such as a truck is in use.

Further, the engine speeds during the sampling period may be selected to be at least 1000 rpm. For cars, higher engine speeds are used, and the engine speeds during the sampling period may be selected to be at least 1500 rpm.

Advantageously, a value T produced according to the invention may be compared to reference value Tref being representative of the engine torque of a standard engine, to enable evaluation of the engine for which the value T was determined.

In a second aspect of the invention, a device for the production of a value T which is representative of the mean engine torque generated on a crankshaft of an internal combustion engine, comprising a measuring device for measuring instantaneous speeds of the engine during a sampling period, calculation means for producing a speed vector of values being representative of the instantaneous speeds of the engine measured during said sampling period, calculation means to derive a mean engine speed n during said sampling time using the speed vector, calculation means to derive a value Px being representative of the power contribution for the frequency x*n from the speed vector, where x is a pre-selected order, and calculation means to derive the desired value T being representative of the mean engine torque on the crankshaft during said sampling period wherein T is derived from a mathematical expression including a polynomial having at least a term k*n*Px, wherein k is a polynomial constant, stored in a memory.

A device according to the invention provides the same advantages and may be combined with especially advantageous features in accordance with the method according to the invention as described above.

The calculation means may but must not all be comprised within one and the same calculation unit, such as a processor unit, a microprocessor, an embedded processor or other suitable calculation unit.

Advantageously, the measuring device may comprise a sensor being arranged for sensing the passage of subsequent rotational indexing references arranged in connection to a flywheel or a crankshaft of the engine, said passages of time being the values t of the speed vector being representatives of instantaneous speeds of the engine.

Preferably, the measuring device comprises a calculation means for determining the speed between subsequent rotational indexing references. The calculation means may but need not be comprised in the same calculation unit as the previously mentioned calculation means of the device.

BRIEF DESCRIPTION OF THE DRAWINGS

Other advantages of the invention will become more apparent in the description of a particular embodiment a method and a device according to the invention given below as a non limiting example with reference to the appended drawings, in which.

DETAILED DESCRIPTION

Figure 1:
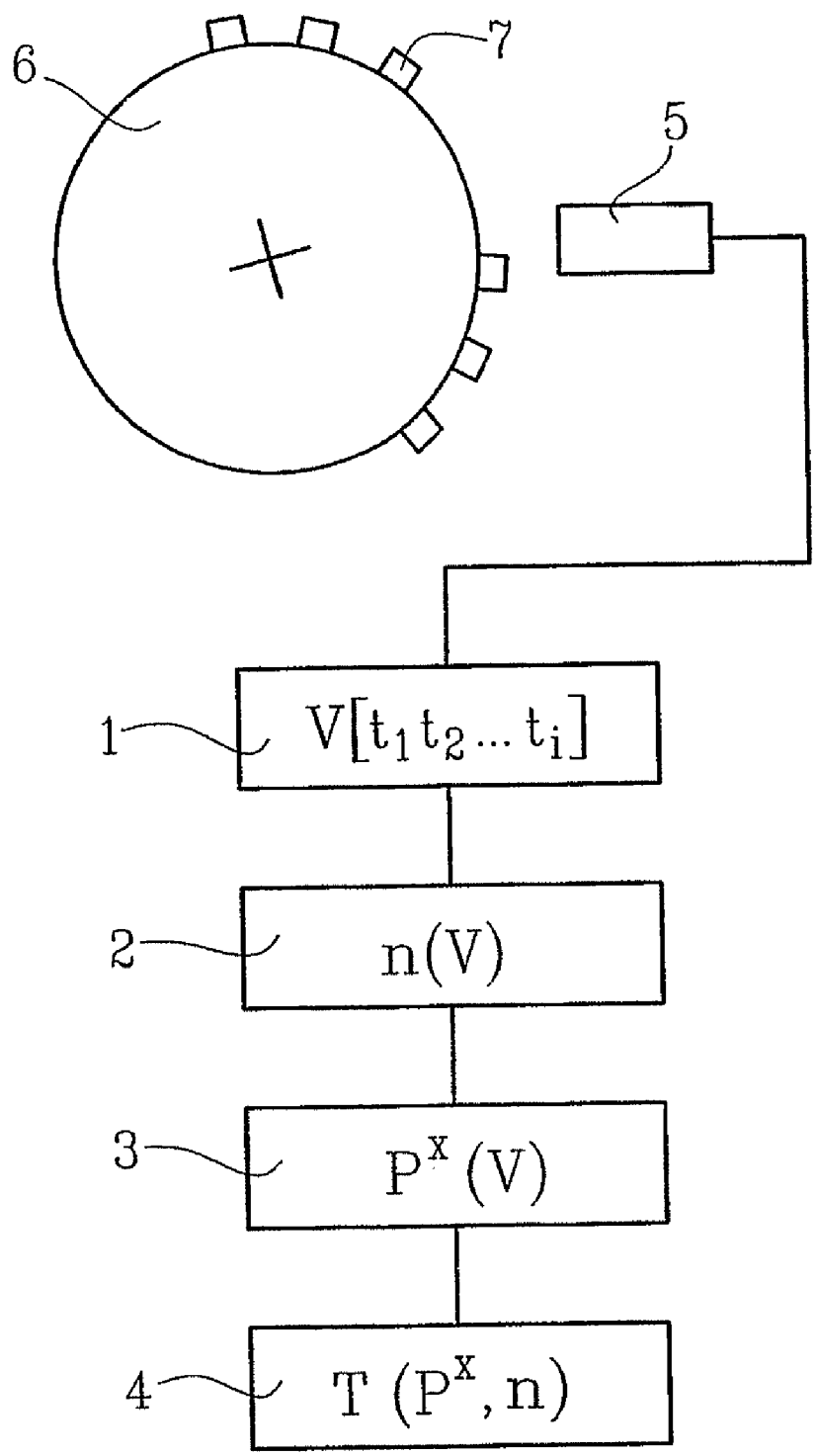
FIG. 1 illustrates schematically an embodiment of a method and device according to the invention.

FIG. 1 schematically illustrates an embodiment of a method and device according to the invention. The device comprises a sensor 5 for sensing the passage of subsequent indexing references 7 in the form of teeth provided in connection with a flywheel 6, which in turn is connected to a crankshaft of a combustion engine. In this case, the sensor 5 is adapted to measure the passage of indexing references at sample intervals having a duration of 1 microsecond, being equal to a frequency of 1 MHz. A frequency of 1 MHz or more results in particularly good results using the method and device of the invention.

The values t provided by the sensor corresponding to the passages of time between subsequent rotational indexing references 7 are then used as representatives of instantaneous speeds of the engine to form a speed vector V in a calculation device/method step 1.

As illustrated in FIG. 1, the indexing references 7 may be irregularly arranged, so that there are gaps between references at certain places. Therefore, the values of the speed vector V are corrected for the missing references by calculating the mean value for the missing references and the next reference, and replacing all of the relevant values with a mean value.

In method step/calculation device 2 of FIG. 1, the mean engine speed n during the sampling period is calculated from the speed vector V, and expressed in rotations/second.

In method step/calculation device 3, the speed vector V is used to produce a phase-amplitude representation, in which the value Px being representative of the power contribution at a selected frequency x*n is calculated.

In a preferred method/device, the method selected to determine the amplitude Px is a Fourier series of sines and cosines. However, other Fourier transform methods may also be useful. Nevertheless, the inventors have found that the sine and cosine method provides useful results without need of an excessive number of samples or calculation capacity.

The sine and cosine method is a true phase-amplitude transformation only when all orders are included. In this case, all orders need not to be included, since it is sufficient to know the amplitude for the order x. The result is a linear equation system that may be solved in least square sense.

The linear equation system to be solved in the sine cosine method can be written as [A]×[C]=[V], where [V] is the speed vector including f values v1, v2 ..., vf measured at regular angular intervals over 2 revolutions of the engine, and [A] is a sine and cosine matrix (fx(2j+1)). The equation is solved for [C] which includes the constants a0, a1, b1, a2, b2 ... ak, bk for a Fourier series.

$$f(t) = \frac{1}{2}a_0 + \sum_{k=1}^{j} a_k \sin(k\Omega t) + b_k \cos(k\Omega t), \Omega = 2\pi/T$$

Since f(t) is periodic with period T=2π, the special case:

$$f(t) = \frac{1}{2}a_0 + \sum_{k=1}^{j} a_k \sin(kt) + b_k \cos(kt)$$

so that the first column of the A matrix is a column of ones, to take care of the initial constant term. (This term is not needed if the average n is subtracted from the values of the V-vector before calculation.) The next column is sine of order one, and thereafter follows cosine of order one. The following columns are sine and cosine for a third, a fourth cycle etc.

$$A = \begin{bmatrix} 1 & \sin(\pi) & \cos(\pi) & \sin(2\pi) & \ldots & \cos(k2\pi) \\ 1 & \sin(\pi/2) & \cos(\pi/2) & \sin(2\pi/2) & \ldots & \ldots \\ \ldots & \ldots & \ldots & \ldots & \ldots & \ldots \\ 1 & \sin(\pi/f) & \cos(\pi/f) & \sin(2\pi/f) & \ldots & \cos(k2\pi/f) \end{bmatrix}$$

$$C = \begin{bmatrix} a_0/2 \\ a_1 \\ b_1 \\ a_2 \\ b_2 \\ \ldots \\ \ldots \\ a_k \\ b_k \end{bmatrix}$$

$$V = \begin{bmatrix} t_1 \\ t_2 \\ \ldots \\ \ldots \\ t_f \end{bmatrix}$$

The equation system is solved, giving the sine and cosine coefficients ax and bx for the selected xth order, that is the phase xn. Knowing ax and bx, the amplitude is given by Pythagoras theorem: $(Px)^2 = a_x^2 + b_x^2$. The necessary length of the measured speed vector V depends on the method used for calculating Px in the following method step, and of the accuracy wanted in the resulting torque value T. If Px is calculated using FFT analysis, a suitable vector length might be about 2000 samples. If Px instead is calculated using a sine and cosine transform, the length of the vector may be considerably shortened, to about 600 samples.

Finally, in method step/calculation device 4, the value T being representative of the mean engine torque is derived from T=k0+k1*P3+k2*n+k3*n*P3, where k0, k1, k2 and k3 all are polynomial constants being stored in a suitable memory.

If a Fast Fourier Transform FFT method is used instead of the sine and cosine method as described above, the amplitude Px of the amplitude-phase diagram corresponding to the frequency f=x*n, where x is the selected order must be calculated. This may advantageously be made from a plot of the FFT transform, and calculating the RMS value of the area of the peak at the relevant frequency, which corresponds to the amplitude Px.

Using the amplitude the RMS value of the area of the peak in a FFT transform, or using the amplitude from the sine and cosine method as Px, will result in different polynomial coefficients k0, ..., k3. Nevertheless, both methods will provide accurate results. The FFT method is believed to require more samples in order to achieve sufficient accuracy than the sine and cosine method.

The value T may be calculated regularly during use of the vehicle and stored in a log for possible evaluation at a regular service occasion or in particular if the driver turns to a garage suspecting that something is wrong with the vehicle. Alternatively, the value T may be used when assessing the function of newly produced vehicles for asserting that the engine torque reaches desired specifications. In both instances, the value T may be compared to a reference value Tref being determined by producing T for a number of reference vehicles.

If the values of T are logged, the appearance of T over time may be used to detect loss of power and to decide whether or not the engine fulfils predetermined requirements.

The polynomial parameters k0, k1, k2 and k3 need to be determined for different situations. Engines and vehicles may probably be put together in groups, each group containing engines and vehicles having the same torque behaviour and using the same polynomial constants. For determining the polynomial parameters, the actual torque T may be measured using e.g. a dynamometer, and be compared to the mathematical expression of T at a number of measurement points being sufficient to set up an equation system from which the values of the constants may be derived.

EXAMPLE

For assessment of the proposed model, torque measurements were made using a dynamometer in an engine test cell and used to calculate the polynomial constants k0, k1, k2 and k3 using the polynomial T=k0+k1*Px+k2*n+k3*n*Px, and the sine cosine (Fourier series) method described above to calculate Px. Additional torque measurements using the dynamometer were made and compared to the results obtained using the resulting polynomial constants.

Since in this case, the engine is a six-cylinder four-stroke engine, the pre-selected order x=3, this being the number of cylinders/2.

Measurements were made under three different testing conditions:
A) Standard engine, no modifications
B) One injector modified to give 20% less flow in cylinder 3. This would give a torque loss of about 3.5%
C) Two injectors modified to give 20% less flow in cylinders 3 and 6. This would give a torque loss of about 7%.

Figure 2:
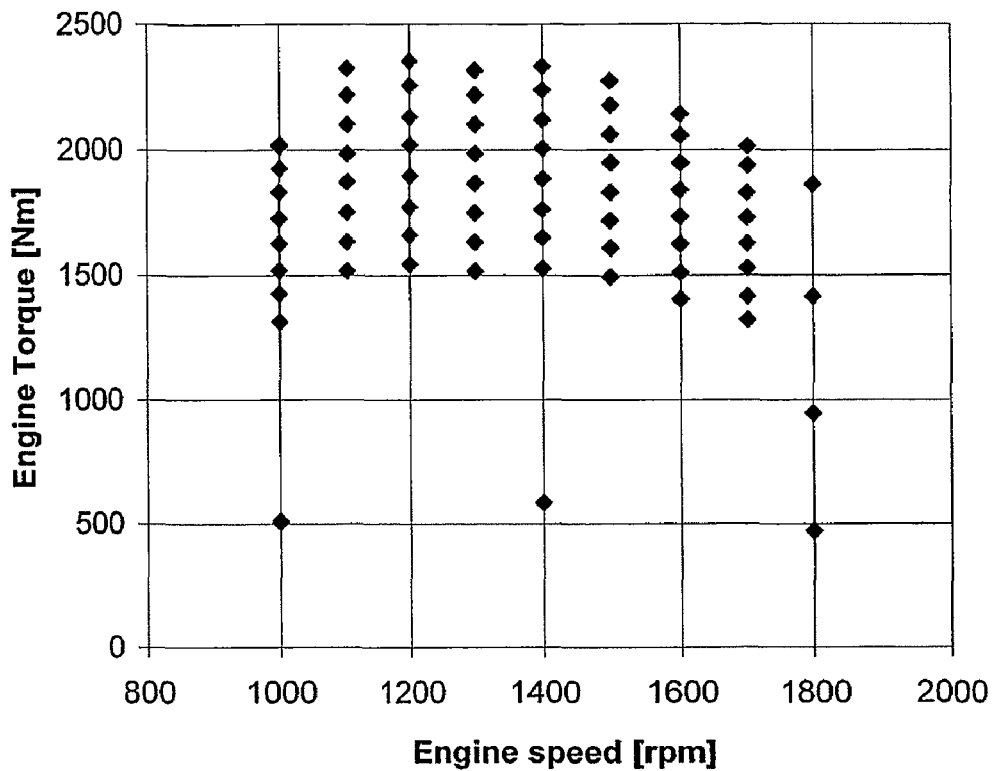
FIG. 2 is a diagram showing the measured loads and engine speeds during an example measurement using an embodiment and device according to the invention.

Torques were measured using the dynamometer and speed vectors were obtained using measurement of tooth pass time of the flywheel in 64 different load conditions with speeds from 1000 rpm up to 1800 rpm in step of 100 rpm, and loads from 65% to 100% in steps of 5% for each testing condition. FIG. 2 is a diagram showing the measured loads at different engine speeds.

From the measurements the polynomial constants of the expression Tmeas=k0+k1*Px+k2*n+k3*n*Px were determined. Px was calculated using the sine and cosine method for x=3. Tmeas are the torques measured using the dynamometer. In order to enhance the precision of the coefficients, the equation was set up for a number of measured torques, and the mean values of the polynomial constants calculated for each measured torque were used to determine the polynomial constants to use in the later torque calculation.

The model was tested by comparing additional values measured with the dynamometer in the engine cell to values calculated using the model T=k0+k1*Px+k2*n+k3*n*Px, for the selected order x=3, and again using the sine and cosine method for determining Px from the measured engine speeds.

Figure 3:
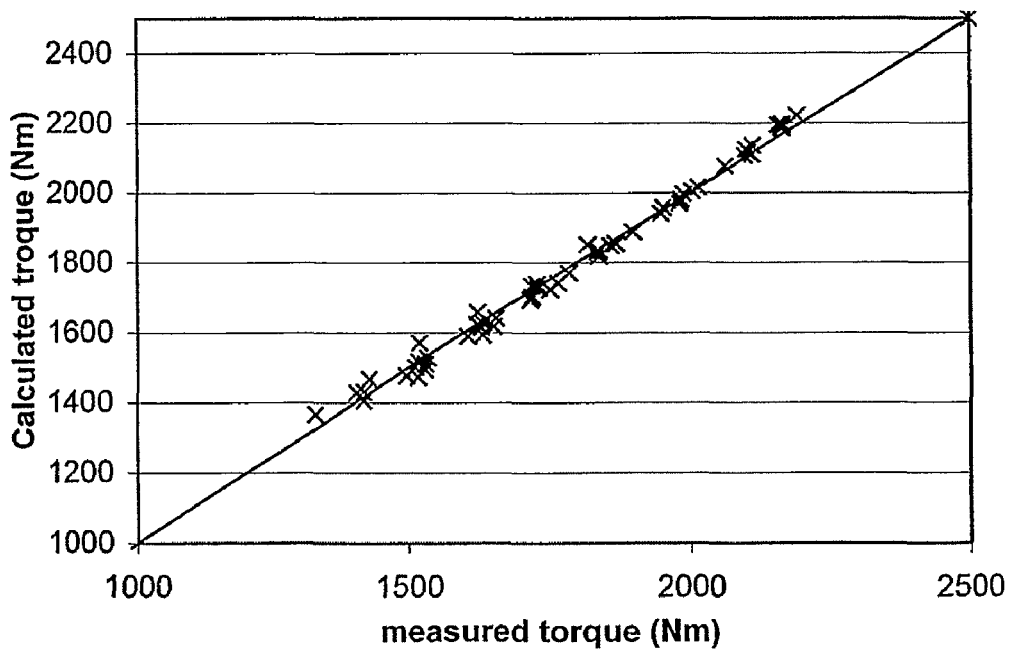
FIG. 3 is a diagram showing the torque calculated using an embodiment of a method and device according to the invention versus the measured torque in the example of FIG. 2.

The calculated versus the measured torque is plotted in FIG. 3. As seen, the values calculated according to the polynomial above are good representatives of the measured values. A precision better than 3% has been found when using models according to the invention in the area of an engine speed of 1000 to 1800 rpm, and 65 to 100% load. The polynomial model gives good results for the unmodified engine and for the modified engines, which shows that the method is also useful for measuring torque when a fault of some kind arises in the engine.

The invention claimed is:

1. A method for producing a value T being representative of mean engine torque generated on a crankshaft of an internal combustion engine, comprising the steps of
   producing a speed vector including values being representative of instantaneous speeds of the engine during a sampling period,
   determining a mean engine speed n during the sampling period from the speed vector
   determining a value Px being representative of the frequency contribution of the speed vector at the frequency x*n, where x is a pre-selected order, and
   producing a value T being representative of the mean engine torque on the crankshaft during the sampling period wherein T is derived from a mathematical expression including a polynomial having at least a term k*n*Px, wherein k is a polynomial constant.

2. A method according to claim 1, wherein T is derived from a mathematical expression including the polynomial: k0+k1*Px +k2*n+k3*n*Px, where k0, k1, k2 and k3 are polynomial constants.

3. A method according to claim 1, wherein T=k0+k1*Px +k2*n+k3*n*Px, where k0, k, k2 and k3 are polynomial constants.

4. A method according to claim 1, wherein the selected order x=(the number of cylinders of the engine)/2.

5. A method according to claim 1, wherein the engine is a two-stroke engine, and the selected order x is equal to the number of cylinders.

6. A method according to claim 1, wherein the sampling period corresponds to at least 10 rotations of the engine.

7. A method according to a claim 1, wherein the speed vector comprises values t being representative of instantaneous speeds of the combustion engine being the passages of time between subsequent rotational indexing references arranged in connection with a flywheel or crankshaft of the combustion engine.

8. A method according to claim 7, wherein the method comprises a compensation step when generating the speed vector, wherein effects of irregularities in an arrangement of the rotational indexing references are compensated for.

9. A method according to claim 1, wherein the value Px is determined using phase-amplitude transformation of the speed vector.

10. A method according to claim 1, wherein the value Px is determined using a Fourier series analysis of the speed vector.

11. A method according to claim 9, wherein the value Px is determined solving an equation system: [A]×[C]=[V], wherein V is a speed vector containing f samples, and A is a matrix for k orders $$A = \begin{bmatrix} 1 & \sin(\pi) & \cos(\pi) & \sin(2\pi) & \ldots & \cos(k2\pi) \\ 1 & \sin(\pi/2) & \cos(\pi/2) & \sin(2\pi/2) & \ldots & \ldots \\ \ldots & \ldots & \ldots & \ldots & \ldots & \ldots \\ 1 & \sin(\pi/f) & \cos(\pi/f) & \sin(2\pi/f) & \ldots & \cos(k2\pi/f) \end{bmatrix}$$

-continued $$C = \begin{bmatrix} a_0/2 \\ a_1 \\ b_1 \\ a_2 \\ b_2 \\ \ldots \\ \ldots \\ a_k \\ b_k \end{bmatrix}$$

$$V = \begin{bmatrix} t_1 \\ t_2 \\ \ldots \\ \ldots \\ \ldots \\ t_f \end{bmatrix}$$

for coefficients ax and bx of the pre-selected order x, and obtaining the amplitude $$P_x = \sqrt{a_x^2 + b_x^2}.$$

12. A method according to claim 11, wherein the value Px is determined by using a Fast Fourier Transform for a phase-amplitude transformation of the speed vector.

13. A method according to claim 12, wherein Px is determined by plotting the Fast Fourier Transform of the speed vector and determining an RMS value of an area under a peak at a frequency x*n.

14. A method according to claim 11, wherein the values t are sampled with a sample interval with a duration of less than or equal to 10 microseconds.

15. A method according to claim 1, wherein the value T is representative of the mean engine torque at the loading conditions during the sampling period, the conditions being selected so as to correspond to at least 50% load.

16. A method according to claim 1, the value T being representative of mean engine torque at engine speeds used during the sampling period, the engine speeds being selected to be at least 1000 rpm.

17. Method for evaluating the function of an engine, comprising the steps of producing a value T according to claim 1, and comparing the value T to a reference value Tref being representative of the engine torque of a standard engine.

18. Device for the production of a value T which is representative of the mean engine torque generated on a crankshaft of an internal combustion engine, comprising
   a measuring device for measuring instantaneous speeds of the engine during a sampling period,
   calculation means for producing a speed vector of values being representative of the instantaneous speeds of the engine measured during the sampling period,
   calculation means to derive a mean engine speed n during the sampling time using the speed vector,
   calculation means to derive a value Px being representative of the frequency contribution of the speed vector at the frequency x*n, where x is a pre-selected order, and calculation means to derive the desired value T being representative of the mean engine torque on the crankshaft during the sampling period wherein T is derived from a mathematical expression including a polynomial having at least a term $k*n*Px$, wherein k is a polynomial constant, stored in a memory.

19. A device according to claim 18, wherein the measuring device comprises a sensor being arranged for sensing passage of subsequent rotational indexing references associated with a flywheel or a crankshaft of the engine, the passages of time being values t of a speed vector being representatives of instantaneous speeds of the engine.

20. A device according to claim 19, wherein the measuring device comprises a calculation means for determining the speed between the subsequent rotational indexing references.

21. A device according to claim 19, comprising a calculation means for calculating a compensation step when generating the speed vector, wherein effects of any irregularities in the arrangement of the rotational indexing references are compensated for.

22. A device according to claim 18, wherein the values t are sampled with a sample interval with a duration of less than or equal to 10 microseconds.

23. A device according to claim 18, wherein T is derived from a mathematical expression including the polynomial: $k0+k1*Px+k2*n+k3*n*Px$, where $k0$, $k1$, $k2$ and $k3$ are polynomial constants, stored in a memory.

24. A device according to claim 18, wherein $T=k0+k1*Px+k2*n+k3*n*Px$, where $k0$, $k1$, $k2$ and $k3$ are polynomial constants, stored in a memory.

25. A device according to claim 18, wherein the selected order of the amplitude x=(the number of cylinders of the engine)/2.

26. A device according to claim 18, wherein sampling period corresponds to at least 10 rotations of the engine.

* * * * *